United States Patent
Shim et al.

(10) Patent No.: US 7,464,196 B2
(45) Date of Patent: Dec. 9, 2008

(54) INPUT/OUTPUT CONTROL METHOD AND APPARATUS OF MULTIMEDIA FILE

(75) Inventors: Jun-seok Shim, Seongnam-si (KR); Boldyrev Serguei, Suwon-si (KR); Jae-min Ryu, Wonju-si (KR); You-jip Won, Seongnam-si (KR); Hyung-kyu Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 11/347,221

(22) Filed: Feb. 6, 2006

(65) Prior Publication Data

US 2006/0206630 A1     Sep. 14, 2006

(30) Foreign Application Priority Data

Feb. 4, 2005     (KR) ...................... 10-2005-0010856

(51) Int. Cl.
    *G06F 3/00*     (2006.01)
(52) U.S. Cl. .............................. 710/16; 710/17; 710/18; 710/19

(58) Field of Classification Search .............. 710/16–19
See application file for complete search history.

(56) References Cited

U.S. PATENT DOCUMENTS 7,149,248 B2 * 12/2006 Aggarwal et al. ...... 375/240.12

\* cited by examiner

*Primary Examiner*—Tammara R Peyton
(74) *Attorney, Agent, or Firm*—Sughrue Mion, PLLC

(57) ABSTRACT

A data input/output control method and apparatus in an input/output subsystem are provided. The data input/output control method, in a system for inputting/outputting data to/from a disk sector according to an input/output command provided from a disk driver, includes: extracting the input/output commands for inputting/outputting the data to/from disk sector from the disk driver and generating a set of input/output commands; analyzing the load feature of the input/output command based on the set of input/output commands; determining whether the load of the input/output command corresponds to a multimedia application; and controlling the data which is input/output to/from the disk to correspond to the multimedia application according to the determination result.

34 Claims, 13 Drawing Sheets

|   |         | A    | B    | C   | D       | E   | F | G     | H    |
|---|---------|------|------|-----|---------|-----|---|-------|------|
| 1 | mpeg2dec| 91   | 92   | 80  | 0~5660  | 130 | 8 | 99.7% | 0.3% |
|   | xine    | 60   | 130  | 70  | 0~9120  | 129 | 8 | 99.8% | 0.2% |
|   | mplayer | 103  | 86   | 80  | 0~4450  | 130 | 8 | 99.7% | 0.3% |
| 2 | xine    | 1660 | 1940 | 820 | 10~7060 | 164 | 8 | 95.0% | 5.0% |
|   | mplayer | 1774 | 2076 | 840 | 20~8070 | 163 | 8 | 95.6% | 4.4% |
| 3 | xine    | 173  | 309  | 80  | 0~10080 | 148 | 8 | 99.4% | 0.6% |
|   | mplayer | 164  | 203  | 80  | 0~1780  | 136 | 8 | 99.5% | 0.5% |
| 4 | xine    | 492  | 661  | 80  | 0~2020  | 153 | 8 | 98.7% | 1.3% |
|   | mplayer | 535  | 620  | 80  | 0~2240  | 152 | 8 | 98.5% | 1.5% |
| 5 | xine    | 227  | 292  | 80  | 0~5820  | 150 | 8 | 99.2% | 0.8% |
|   | mplayer | 229  | 252  | 80  | 0~2200  | 144 | 8 | 99.3% | 0.7% |
| 6 | xine    | 525  | 701  | 80  | 0~2790  | 160 | 8 | 98.4% | 1.6% |
|   | mplayer | 569  | 772  | 80  | 0~10890 | 153 | 8 | 98.1% | 1.9% |

INPUT/OUTPUT CONTROL METHOD AND APPARATUS OF MULTIMEDIA FILE

CROSS-REFERENCE TO RELATED PATENT APPLICATION

This application claims priority from Korean Patent Application No. 10-2005-0010856, filed on Feb. 4, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to data input/output control in an input/output subsystem, and more particularly, to analyzing a load feature of an input/output command of an application, determining whether the load of the input/output command corresponds to a multimedia application, and controlling the data input/output command delivered to a disk to correspond to the multimedia application according to the determination result.

2. Description of the Related Art

Disks have performed the important function of storing data in everything from mainframes to laptop computers for the past 30 years. In the past, the main concern about disks was their data storage capacity. However, since the data storage capacity of disks has been sufficiently increased in recent years, the intelligence of the disk has become a focus, to allow it to perform the role of the input/output subsystem.

FIG. 1 is a functional block diagram of a general input/output subsystem. The input/output subsystem includes an application layer 110, a file system layer 120, a disk driver layer 130 and a disk 140.

An operating system receives a file name input by a user from the application layer 110, which is an upper layer of the operating system, and retrieves the file name from a whole directory which is managed by itself. In the operating system, the input file is identified using file identification information called a file descriptor.

The storage space of the disk includes spatial components such as a track and a sector, and the file system layer 120 performs the role of organizing the spatial components into a linear array of logical blocks. In the general file system layer, each file is connected with a data structure, which is called an inode and has file related information such as the location, the last update time, and the access mode of the logical block in which the data is stored. The file system layer 120 retrieves the inode connected with the file which is a target of the input/output operation from the file descriptor which is received from the operating system, fetches the file related information from the inode, and performs the input/output operation.

The disk driver layer 130 connects the disk 140 to the operating system. The logical block number which is output as the result of the input/output operation is delivered to the disk driver layer 130. Since the disk 140 does not recognize the logical block number, the disk driver layer 130 converts the logical block number into physical spatial information such as a cylinder, a track and a sector, and delivers the physical spatial information to the disk 140. The disk 140 performs the input/output operation using the physical spatial information.

The general input/output subsystem inputs the data to and/or outputs the data from the disk 140 according to the input/output command received from the disk driver layer 120, whether the file which is the target of the input/output command is a text file or a multimedia file.

Information electronic devices having a computer function such as information processing, transmission and storage have a specialized load of the input/output command, such as recording or playback of multimedia data such as video files and music files, unlike a general-purpose computer.

Accordingly, a data input/output control method and apparatus in the input/output subsystem which determines whether the load of the input/output command corresponds to the multimedia application and controls the data input/output command delivered to the disk to correspond to an optimal mode of the multimedia application according to the determination result is required.

SUMMARY OF THE INVENTION

The present invention provides a method for determining whether the load of an input/output command corresponds to a multimedia application and controlling the data input/output command delivered to a disk to correspond to the optimal mode of the multimedia application according to the determination result.

The present invention also provides an apparatus for determining whether the load of an input/output command corresponds to a multimedia application and controlling the data input/output command delivered to a disk to correspond to the optimal mode of the multimedia application according to the determination result.

According to an aspect of the present invention, there is provided a data input/output control method in a system for inputting/outputting data to/from a disk sector according to an input/output command provided from a disk driver, including: extracting the input/output commands for inputting/outputting the data to/from the disk sector from the disk driver and generating a set of input/output commands from the input/output commands; analyzing the load feature of the input/output command based on the set of input/output commands; determining whether the load of the input/output command corresponds to a multimedia application based on the load feature of the input/output command; and controlling the data which is input/output to/from the disk to correspond to the multimedia application according to the determination result.

The extracting the input/output commands may include: extracting the input/output commands for inputting/outputting the data to/from the disk sector from the disk driver to store them during a first time; and generating the set of input/output commands composed of the recent input/output commands during a second time from among the input/output commands stored during the first time.

The analyzing the load feature may include: extracting the load features of the input/output commands from the set of input/output commands; and calculating a statistic of the load features of the input/output commands from the load features of the input/output commands and analyzing the load feature of the input/output command.

The determining whether the load of the input/output command corresponds to the multimedia application may include: classifying the load feature of the input/output command from the statistic of the load features of the input/output commands by a classifying unit generated by learning the load feature of the input/output command of the multimedia application; and determining whether the load of the input/output command corresponds to the multimedia application, based on the classification of the classifying unit.

The controlling the data may include: setting a field value for representing whether the load of the input/output command corresponds to the multimedia application, according to the determination result; and controlling the data which is input/output to/from the disk based on the set field value.

According to another aspect of the present invention, there is provided a data input/output control apparatus in a system for inputting/outputting data to/from a disk sector according to an input/output command provided from a disk driver, including: an extracting unit which extracts the input/output command for inputting/outputting the data to/from the disk sector from the disk driver and generates a set of input/output commands from the extracted input/output command; an analyzing unit which analyzes the load feature of the input/output command based on the set of input/output commands; a determining unit which determines whether the load of the input/output command corresponds to a multimedia application based on the load feature of the input/output command; and a controlling unit which controls the data which is input/output to/from the disk to correspond to the multimedia application according to the determination result.

The extracting unit may include: a storing unit which stores the input/output commands for inputting/outputting the data to/from the disk sector during a first time; and a generating unit which generates the set of input/output commands composed of the recent input/output commands during a second time from among the input/output commands stored during the first time.

The generating unit may include: a first extracting unit which extracts the input/output commands and stores them in the storing unit; an updating unit which removes the oldest input/output command from the input/output commands stored during the first time and adds a new input/output command to the input/output commands during the first time to update the input/output commands during the first time, if the new input/output command is requested from the disk driver; and an input/output command set generating unit which generates the set of input/output commands composed of the recent input/output commands during the second time from among the updated input/output commands.

The analyzing unit may include: a second extracting unit which extracts the load features of the input/output commands from the set of input/output commands; and a calculating unit which calculates a statistic of the load features of the input/output commands from the load features of the input/output commands.

The determining unit may include: a classifying unit which classifies the load feature of the input/output command based on the learning result generated by learning the load feature of the input/output command of the multimedia application and the statistic of the load feature of the input/output command; and a load determining unit which determines whether the load of the input/output command corresponds to the multimedia application based on the classification of the classifying unit.

The controlling unit may include: a setting unit which sets a field value for representing whether the load of the input/output command corresponds to the multimedia application, according to the determination result; and an input/output controlling unit which controls the data which is input/output to/from the disk based on the set field value.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
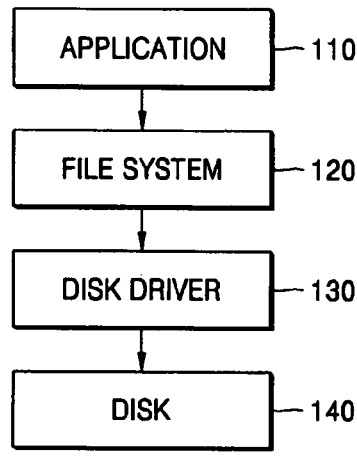
FIG. 1 is a functional block diagram of a general input/output subsystem.
Figure 2:
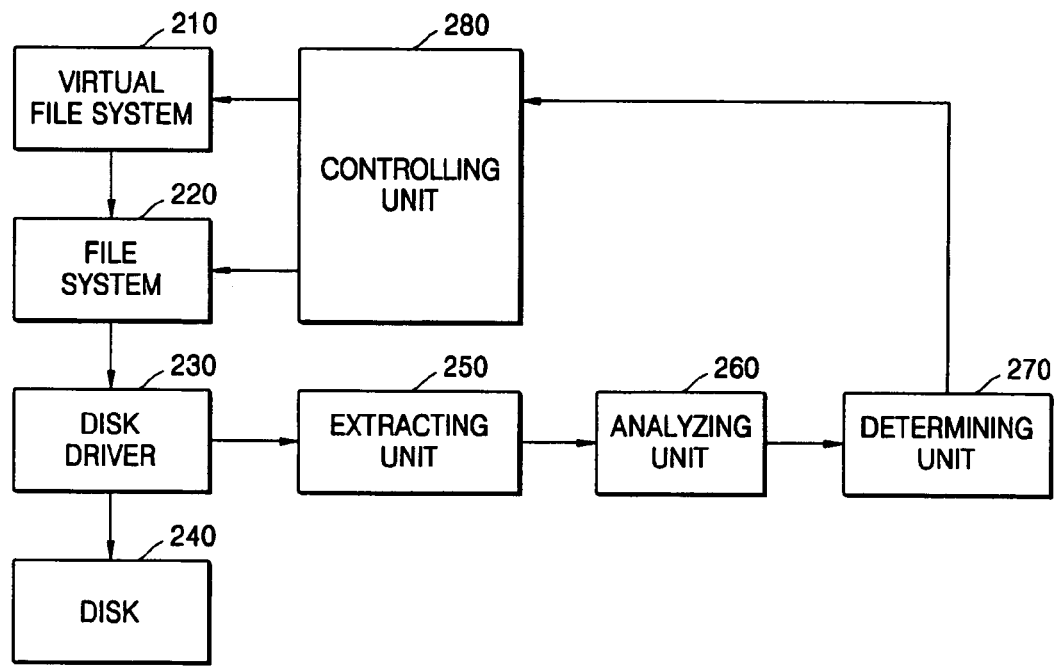
FIG. 2 is a functional block diagram of a data input/output control apparatus according to an exemplary embodiment of the present invention.

FIG. 2 is a functional block diagram of a data input/output control apparatus according to an exemplary embodiment of the present invention.

A virtual file system 200 includes a field (not shown) for controlling the input/output of a file when the file is selected by an application (not shown). The field includes values for controlling the input/output of the data, such as a field value for controlling the size of the disk sector requested by an input/output command (hereinafter, referred to as the size of read-ahead) and a field value for controlling whether errors in the data read from the disk will be corrected. The virtual file system 210 controls the input/output of the data for the selected file according to the field value. The file system 220 specifies a logical block corresponding to the selected file according to the control of the virtual file system 210, and delivers the specified logical block to a disk driver 230. The disk driver 230 delivers the input/output command for inputting the data to and/or outputting the data from the disk sector corresponding to the logical block to a disk 240.

The disk driver 230 includes a first memory (not shown) for storing the input/output command delivered to the disk 240. An extracting unit 250 extracts the input/output command delivered to the disk 240 from the disk driver 230. The input/output command extracted by the extracting unit 250 is stored in a second memory (not shown) included in the extracting unit 250. Whenever a new input/output command is delivered from the disk driver 230 to the disk 240, the extracting unit 250 removes the oldest input/output command stored in the second memory and stores the new input/output command in the second memory to update the input/output commands. A set of input/output commands (referred to as a trace of the input/output commands) is generated from the updated input/output commands and is provided to the analyzing unit 260.

The analyzing unit 260 analyzes the load feature of the input/output command delivered to the disk 240 from the disk driver 230. The analyzing unit 260 extracts the load features of the input/output commands from the set of input/output commands and calculates a statistic of the load features of the input/output commands.

The determining unit 270 determines whether the load of the input/output command corresponds to a multimedia application, based on the load feature of the input/output command analyzed by the analyzing unit 260.

The controlling unit 280 sets the field value of the virtual file system 210 as the load of the input/output command of the multimedia application according to the determination result of the determining unit 270, and controls the input/output of the data according to that field value. By setting the field value as the load of the input/output command of the multimedia application, the maximum size of the disk sector requested by the input/output command is not increased, or errors in the data read from the disk are not corrected.

Figure 3:
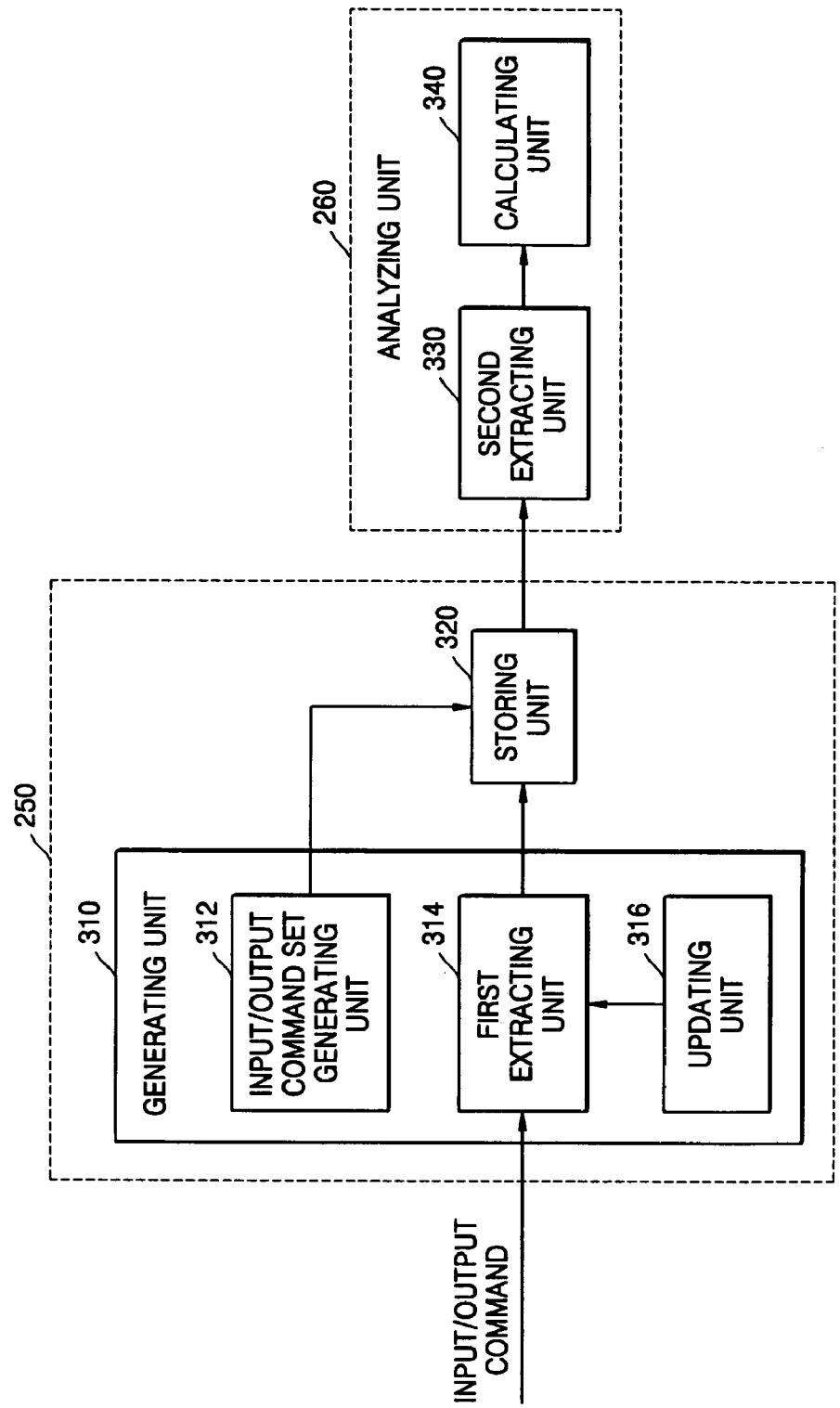
FIG. 3 is a functional block diagram of an extracting unit and an analyzing unit of the data input/output control apparatus shown in FIG. 2 according to an exemplary embodiment of the present invention.

FIG. 3 is a functional block diagram of the extracting unit 250 and the analyzing unit 260 according to an exemplary embodiment of the present invention. The extracting unit 250 includes a generating unit 310 and a storing unit 320, and the analyzing unit 260 includes a second extracting unit 330 and a calculating unit 340.

First, the extracting unit 250 will be described. The generating unit 310 of the extracting unit 250 generates a set of input/output commands composed of the most recent input/output commands during a second time among the stored input/output commands. The generating unit 310 includes an input/output command set generating unit 312, a first extracting unit 314 and an updating unit 316. The first extracting unit 314 extracts the input/output command delivered to the disk 240 from the disk driver 230. The extracting unit 250 includes a storing unit 320 for storing the input/output commands extracted by the first extracting unit 314 during a first time.

When the disk driver 230 request the disk 240 to update a new input/output command, the updating unit 316 removes the oldest input/output command during the first time and adds the new input/output command to the input/output commands during the first time to update the input/output commands during the first time. The input/output command set generating unit 312 generates a set of input/output commands composed of the input/output commands during a second time from the input/output commands during the first time which is updated by the updating unit 316.

According to the application field of the present invention, the storing unit 320 may be composed of a first storing unit (hereinafter, referred to as a free-list) which is a set of usable storage spaces, and a second storing unit (hereinafter, referred to as a used-list) which is a set of used storage space. The input/output commands during the first time extracted by the first extracting unit 314 are stored in the used-list. When a new input/output command is extracted, the updating unit 316 fetches a storage space from the free-list in which to store the new input/output command, and connects that storage space to the used-list. Also, the updating unit 316 removes the oldest input/output command stored in the used-list and returns the storage space in which the removed input/output command was stored to the free-list. The input/output command set generating unit 312 generates a set of input/output commands composed of the recent input/output commands during the second time, from among the input/output commands stored in the used-list. According to the application field of the present invention, the period of the first time may be equal to that of the second time. This is included in the scope of the present invention.

According to the application field of the present invention, the storing unit 320 may be a mass storage medium connected by a general-purpose interface. In this case, the input/output commands extracted by the first extracting unit 314 are continuously stored in the storing unit 320, and the input/output command set generating unit 312 generates a set of input/output commands composed of the recent input/output commands during the second time, from among the input/output commands stored in the storing unit 320.

The analyzing unit 260 analyzes the load feature of the input/output command based on the set of input/output commands. The second extracting unit 330 extracts the load feature of the input/output command which composes the set of input/output commands. The input/output command delivered to the disk 240 from the disk driver 230 includes information for inputting/outputting the data which is requested for executing a file in an application to/from the sector of the disk 240. The second extracting unit 330 extracts the load feature of the input/output command, for example, an input/output request time, the number of input/output sectors and the location of the input/output sectors, from this information.

The calculating unit 340 calculates the statistic of the load features of the input/output commands. The statistic of the load features of the input/output commands represents the loads of the input/output commands delivered to the disk 240 from the disk driver 230, and may be the average of the input/output request time intervals, the standard deviation, the median, the range of the input/output request time intervals, the number of sectors read during a unit of time, or the number of input/output commands during a unit of time.

Figure 4:
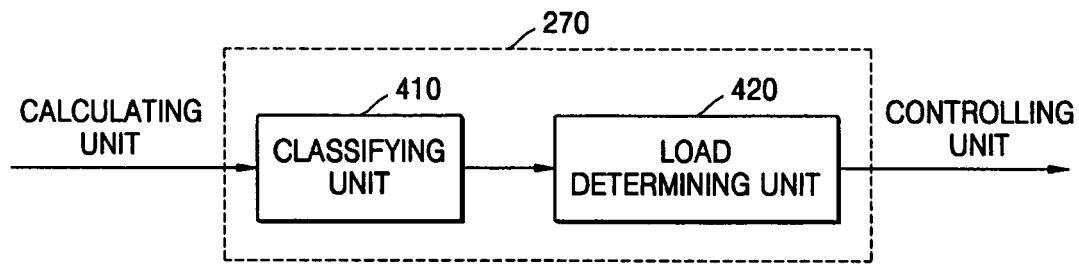
FIG. 4 is a functional block diagram of a determining unit of the data input/output control apparatus shown in FIG. 2 according to an exemplary embodiment of the present invention.

FIG. 4 is a functional block diagram of the determining unit 270 according to an exemplary embodiment of the present invention. The determining unit 270 includes a classifying unit 410 and a load determining unit 420.

The classifying unit 410 classifies the loads of the input/output commands based on the statistic of the load features of the input/output commands. The classifying unit 410 is manufactured based on the learning result generated by learning the load feature of the input/output command of at least one multimedia application.

During at least one multimedia application such as mpeg2dec, xine or mplayer executes at least one multimedia file such as low quality news, high quality news, low quality music video or high quality music video, the material relating to the input/output request time during a unit of time and the number of input/output sectors is extracted. An input variable is generated using the extracted material. The input variable is the average of the input/output request time intervals, the standard deviation, the median, the range of the input/output request time intervals, the number of sectors read during a unit of time, or the number of input/output commands during a unit of time, which are calculated from the extracted material. The calculated input variable is input to a boosting algorithm and a decision tree is generated based on the input result.

The classifying unit 410 classifies whether the set of input/output commands corresponds to the multimedia application, based on the generated decision tree. That is, the classifying unit 410 receives the statistic of the set of input/output commands and classifies whether the load of the input/output command corresponds to the multimedia application, based on the decision tree.

According to the application field of the present invention, the load feature of the input/output command of the multimedia application can be learned by another learning method, such as Baysian learning, neural network or support vector machine. These are included in the present invention.

The load determining unit 420 determines whether the load of the input/output command corresponds to the multimedia application, based on the classification of the classifying unit 410.

Figure 5:
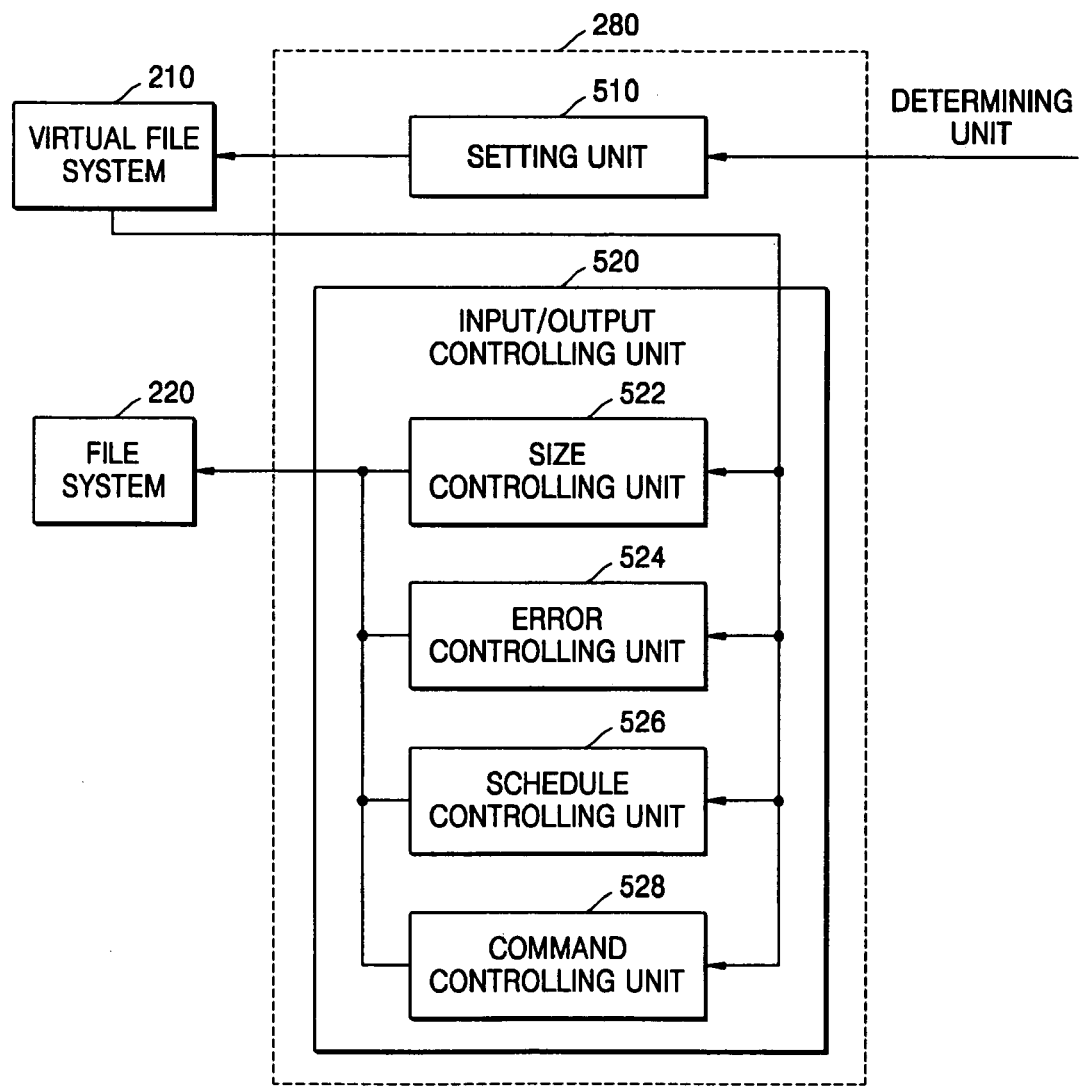
FIG. 5 is a functional block diagram of a controlling unit of the data input/output control apparatus shown in FIG. 2 according to an exemplary embodiment of the present invention.

FIG. 5 is a functional block diagram of the controlling unit 280 according to an exemplary embodiment of the present invention. The controlling unit 280 includes a setting unit 510 and an input/output controlling unit 520, and controls the data which is input/output to/from the disk 240 to correspond to the multimedia application, according to the determination result of the determining unit 270.

The setting unit 510 sets the field value of the file object to represent whether the load of the input/output command corresponds to the multimedia application, according to the determination result of the determining unit. If the file is selected in the predetermined application, a file object representing the relationship between the process of the application and the selected file is generated. The file object includes a field for controlling the input/output of the selected file. The setting unit 510 sets the field value for optimally inputting/outputting the selected file in correspondence with the multimedia application as a first value.

The maximum size of the disk sector which is requested by the general input/output command is 256. Since the size of one sector is 512 bytes, the rate (Kbytes) of the data which can be read through 256 sectors is 128 Kbytes. In view of a streaming service, the data rate may be 1024 Kbytes, that is, 1 Mbyte. This corresponds to at most 0.1 second of a high definition (HD) movie, and is not suitable for reading a mass multimedia file. Accordingly, if it is determined that the load of the input/output command corresponds to the multimedia application in the determining unit 270, it is preferable to increase the maximum size of the disk sector which can be requested by the input/output command when reproducing the multimedia file, that is, the size of the read-ahead, because the multimedia file is stored continuously in the disk. The setting unit 510 sets the field value as a first value to increase the size of the read-ahead.

When the multimedia file is reproduced by an application, the last access time of the multimedia file is not important. Accordingly, when the multimedia file is reproduced, the operation of recording the file connecting time in the inode is not important. Therefore, if it is determined that the load of the input/output command corresponds to the multimedia application, it is preferable that the access time of the file is not recorded in the inode. The setting unit 510 sets the field value as the first value so that the access time of the file is not recorded in the inode.

When two non-adjacent sectors A and B are read, the sector A is read and then the sector B is read by moving a disk arm to the track of the sector B. In a general disk read schedule, the disk is idle until the disk arm reaches the sector B, which reduces the disk read efficiency. However, if it is determined that the load of the input/output command corresponds to the multimedia application, it may be preferable that the sectors located in the path on which the disk arm moves from the sector A to the sector B are previously read, because the multimedia file is read sequentially. The setting unit 510 sets the field value as the first value so that the sectors located in the path on which the disk arm moves from the sector A to the sector B are previously read.

When data is read from a sector of the disk, it is checked whether any errors exists in the data. If so, the disk arm moves to the sector of the data in which the error exists and the data is read again. However, when a multimedia file is reproduced, small errors are insignificant. In fact, correcting such errors can cause bad reproduction, due to the time taken to move the disk arm. Accordingly, if it is determined that the load of the input/output command corresponds to the multimedia application, it may be preferable that the next sector of the data is read without correcting the error. The setting unit 510 sets the field value as the first value so that the next sector of the data is read without correcting the error.

The input/output controlling unit 520 controls the file system such that the selected file is optimally input/output in correspondence with the multimedia application according to the set field value. The input/output controlling unit 520 includes a size controlling unit 522, an error controlling unit 524, a schedule controlling unit 526 and a command controlling unit 528.

The size controlling unit 522 controls the input/output data such that the maximum size of the sector is increased in the file system, if the field value is set as the first value. The error controlling unit 524 controls the input/output data such that the process for correcting the error is not performed in the file system, if the field value is set as the first value. The schedule controlling unit 526 controls the input/output data such that the sectors located in the path on which the disk arm moves are in advance read in the file system, if the field value is set as the first value. The command controlling unit 528 controls the input/output data such that commands which are not required for reproducing the multimedia file, for example, write commands, are not performed in the file system, if the field value is set as the first value.

Figure 6:
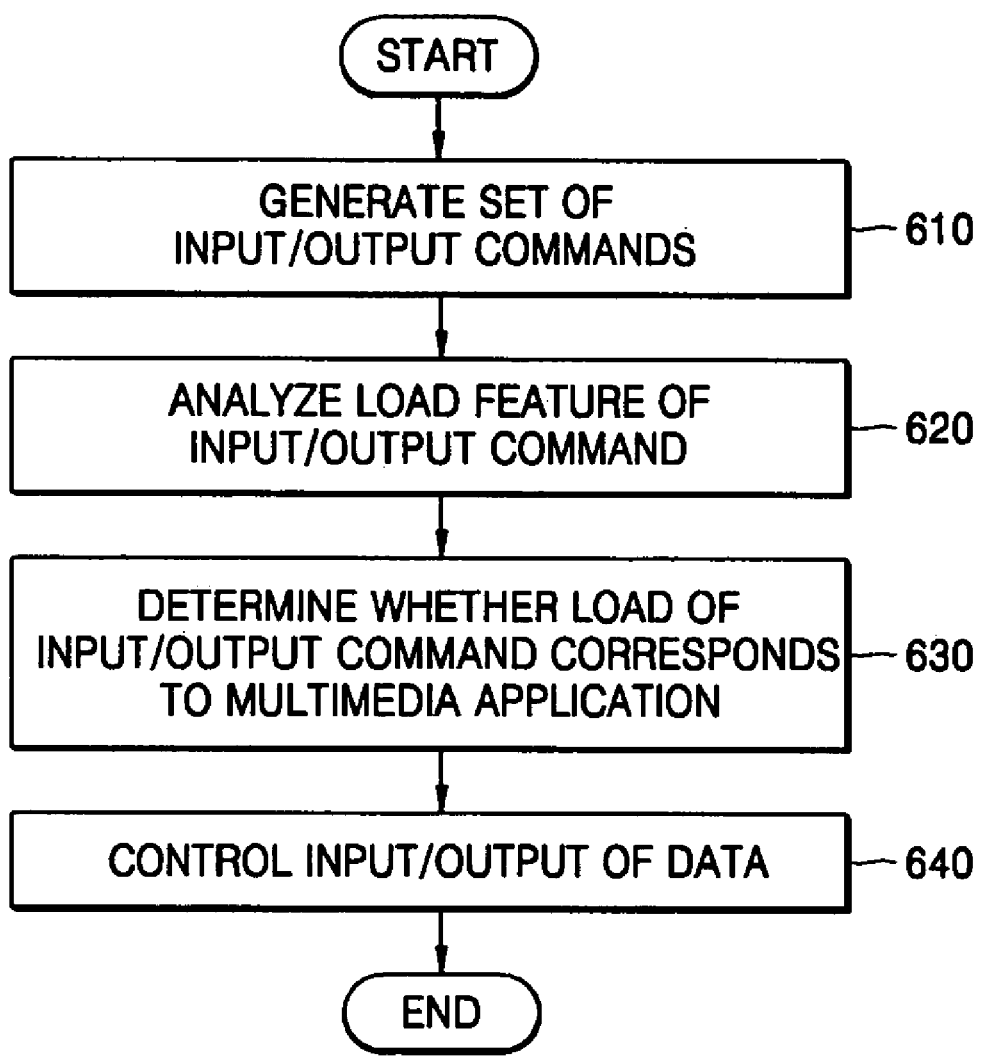
FIG. 6 is a flowchart showing a data input/output control method according to an exemplary embodiment of the present invention.

FIG. 6 is a flowchart showing a data input/output control method according to an exemplary embodiment of the present invention. In the data input/output control method, an input/output command for inputting/outputting the data to/from the disk sector is extracted from the disk driver, and a set of input/output commands is generated from the extracted input/output command (operation 610). The load feature of the input/output command is extracted from the set of input/output commands, and a statistic of the load feature is calculated to analyze the load feature of the input/output command (operation 620). It is determined whether the load of the input/output command corresponds to the multimedia application, based on the load feature of the input/output command (operation 630). The data which is input/output to/from the disk is controlled to correspond to the multimedia application according to the determination result (operation 640).

Figure 7:
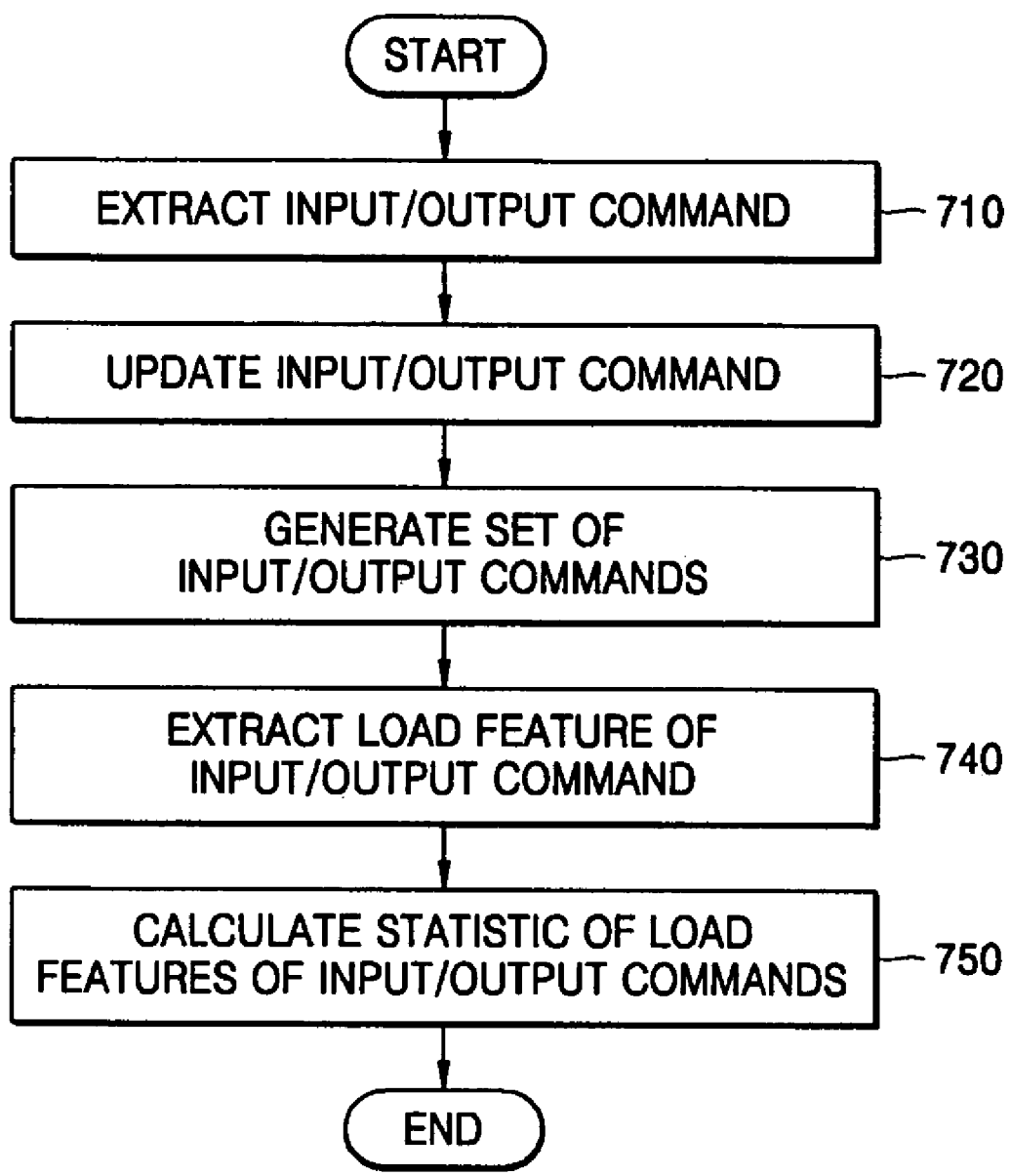
FIG. 7 is a flowchart of an operation for generating a set of input/output commands and an operation for analyzing the feature of the input/output command in FIG. 6.

FIG. 7 is a flowchart of the operation 610 for generating the set of input/output commands and the operation 620 for analyzing the load feature of the input/output command. The input/output command for inputting/outputting the data to/from the disk sector is extracted from the disk driver (operation 710). The extracted input/output command is stored in the storing unit during a first time. If a new input/output command is delivered to the disk from the disk driver, the oldest input/output command is removed from the input/output commands during the first time and the new input/output command is added to the input/output commands during the first time. That is, whenever the new input/output command is delivered, the input/output commands during the first time are updated (operation 720). A set of input/output commands composed of the input/output commands during the second time is generated from the updated input/output commands during the first time (operation 730). The operations 710 through 730 together form the operation 610.

The load features of the input/output commands, such as the input/output request time of the input/output command, the number of input/output sectors and the location of the input/output sectors, are extracted from the set of input/output commands (operation 740). The statistic of the loads of the set of input/output commands is calculated from the load features of the input/output commands (operation 750). The statistic may be the average of the input/output request time intervals, the standard deviation, the median, the range of the input/output request time intervals, the number of sectors read during a unit of time, or the number of input/output commands during a unit of time. The operations 740 and 750 together form the operation 620. According to the application field of the present invention, different types of load feature of the input/output command and statistics of the loads of the input/output commands may be used. These are included in the scope of the present invention.

Figure 8:
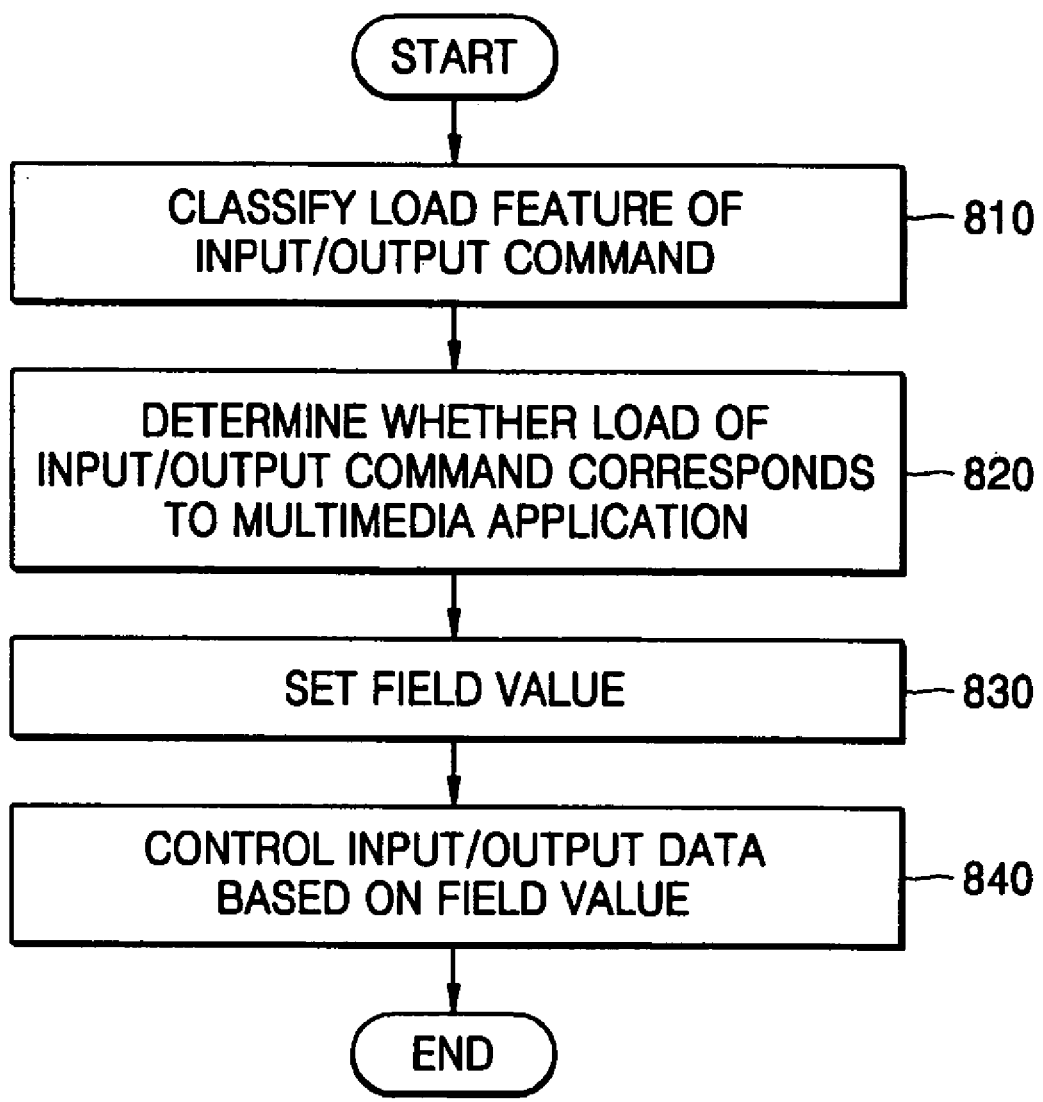
FIG. 8 is a flowchart of an operation for determining whether the load of the input/output command corresponds to a multimedia application and an operation for controlling data which is input/output to/from the disk in FIG. 6.

FIG. 8 shows the operation 630 for determining whether the load of the input/output command corresponds to a multimedia application and an operation 640 for controlling data which is input/output to/from the disk. The load features of the input/output commands are classified by the classifying unit generated by learning the input/output command of the multimedia application according to the statistic of the load features of the input/output commands generated by the calculating unit (operation 810). It is determined whether the load of the input/output command corresponds to the multimedia application based on the classification of the classifying unit (operation 820). The field value for representing whether the load of the input/output command corresponds to the multimedia application is set as the first value, according to the determination result (operation 830).

The data which is input to and/or out from the disk is controlled based on the set field value (operation 840). If the field value is set as the first value, then the data is controlled such that the maximum size of the read-ahead is increased, errors are not corrected, and the type of input/output command is filtered so that unnecessary input/output commands are not performed. Preferably, but not necessarily, the input/output command which is unnecessary for the multimedia application is a write command for updating the access time of inodes storing information related to the multimedia file. Also, if the field value is set as the first value, the disk read schedule is controlled such that sectors located in the path on which the disk arm moves are read.

Now, referring to FIGS. 9 and 10, the feature of the input/output command of the multimedia application which is learned so as to manufacture the classifying unit will be described.

FIGS. 9A through 9M show a set of input/output commands, that is, a trace of the input/output commands of the plurality of multimedia applications. FIGS. 9A through 9M show the form that the plurality of the multimedia applications which are widely used, for example, xine, mpeg2dec or mplayer, access the disk. The X axis indicates a time of the input/output command accession and the Y axis indicates the number of sectors of the input/output commands which are delivered to the disk.

Figure 9A:
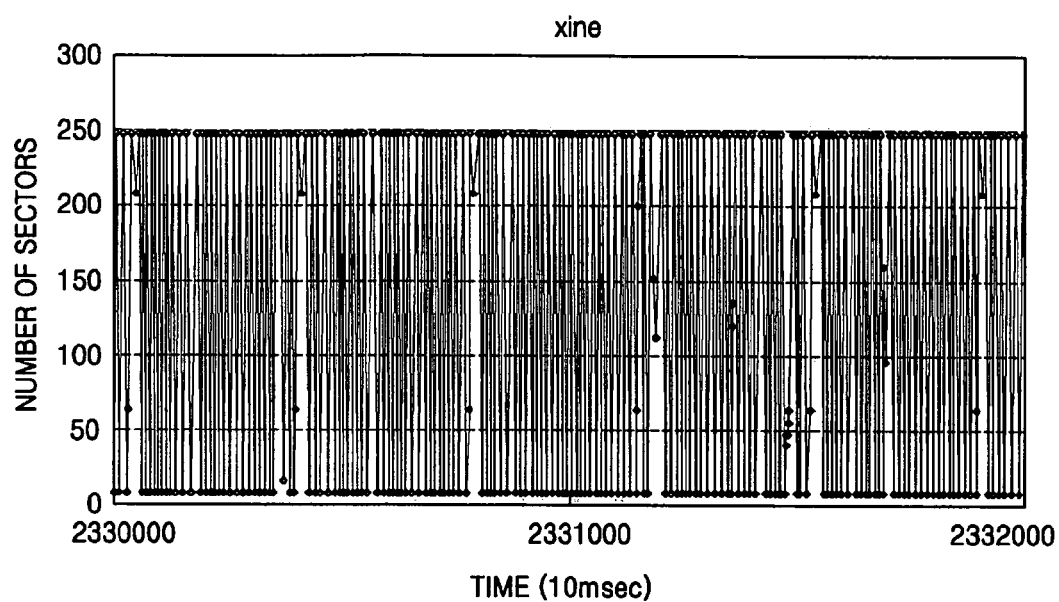
FIGS. 9A through 9M show a set of input/output commands of a plurality of multimedia applications, that is, a trace of the input/output commands.
Figure 9B:
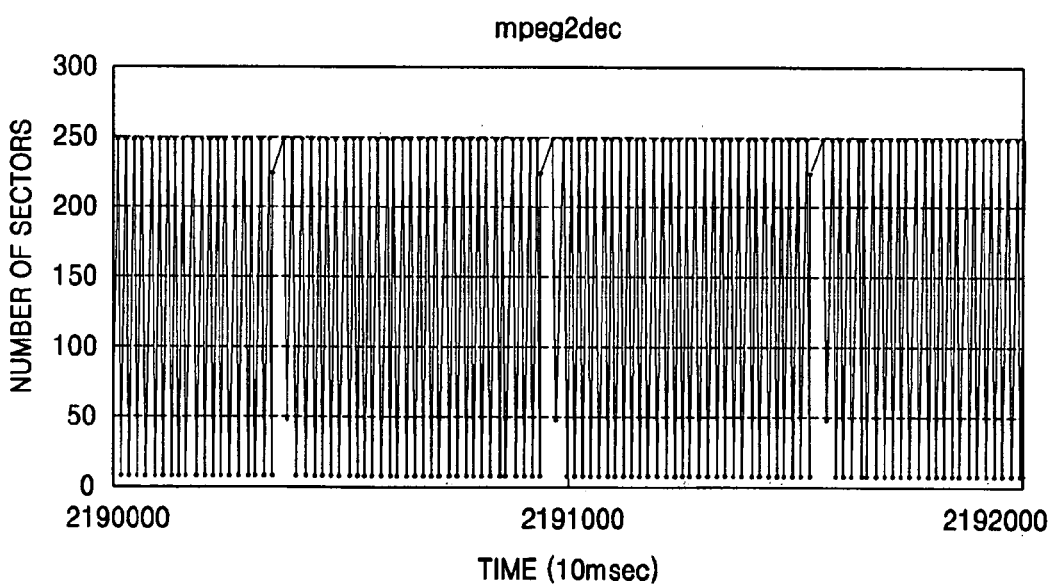
Figure 9C:
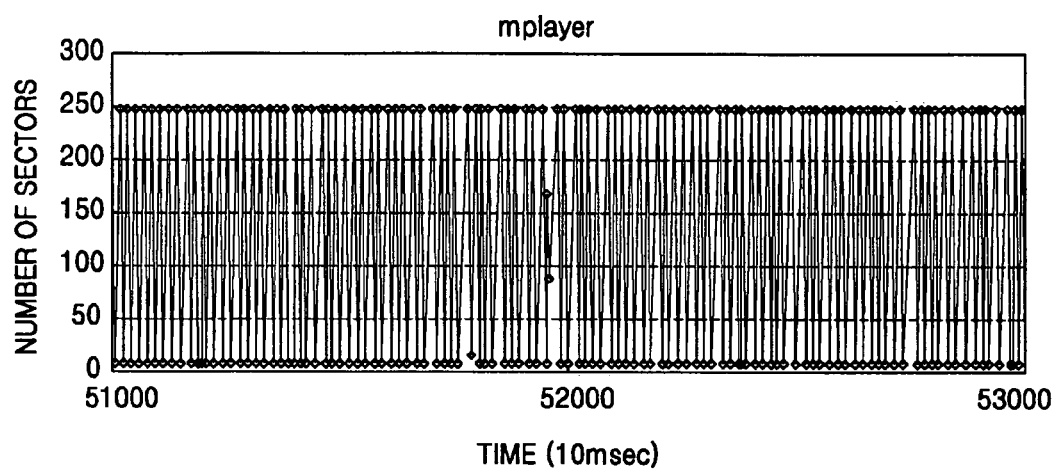
Figure 9D:
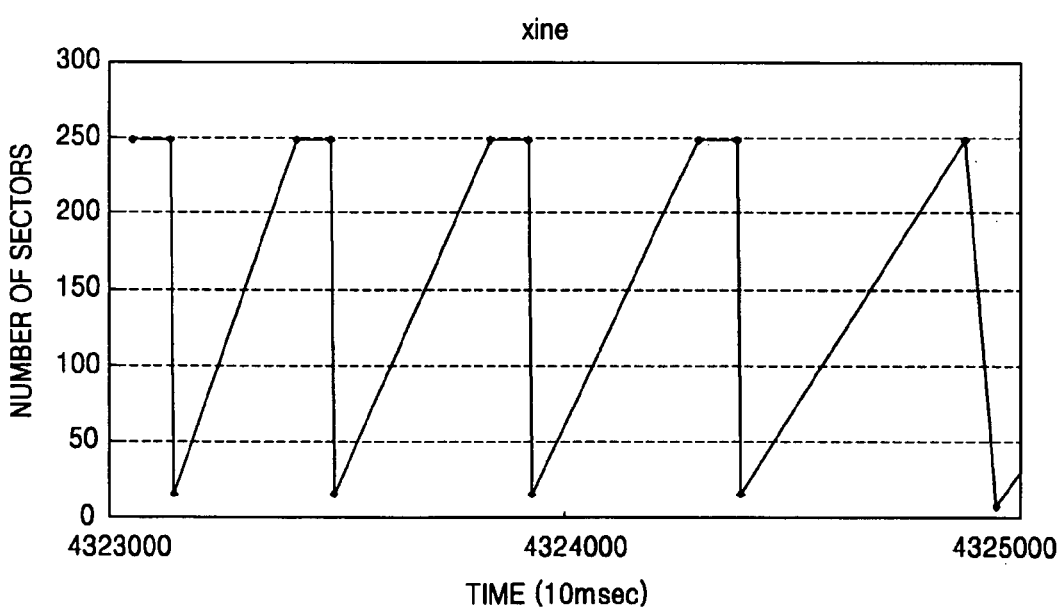
Figure 9E:
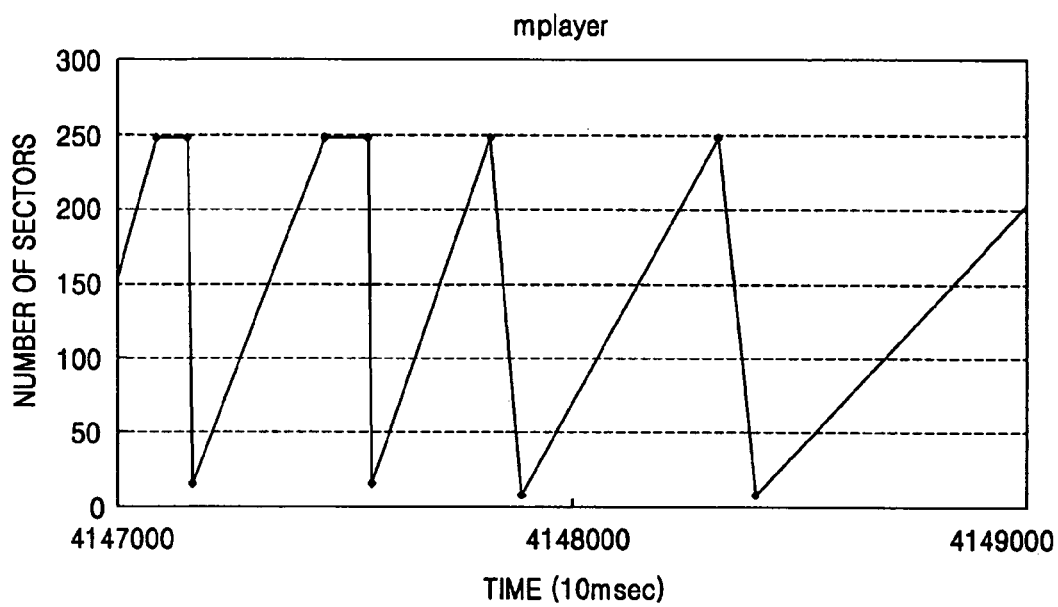
Figure 9F:
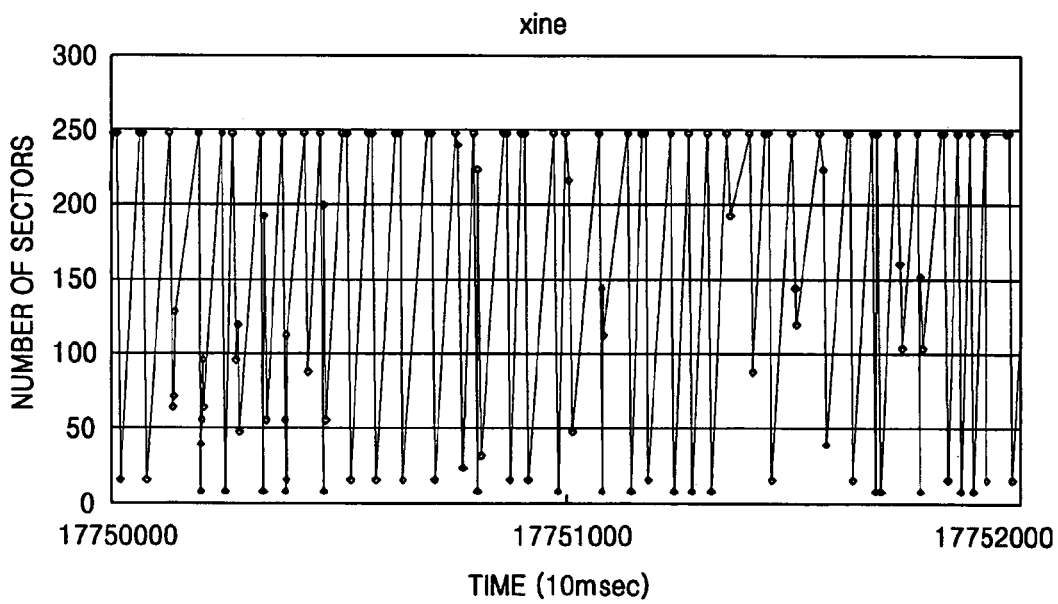
Figures 9G, 9H:
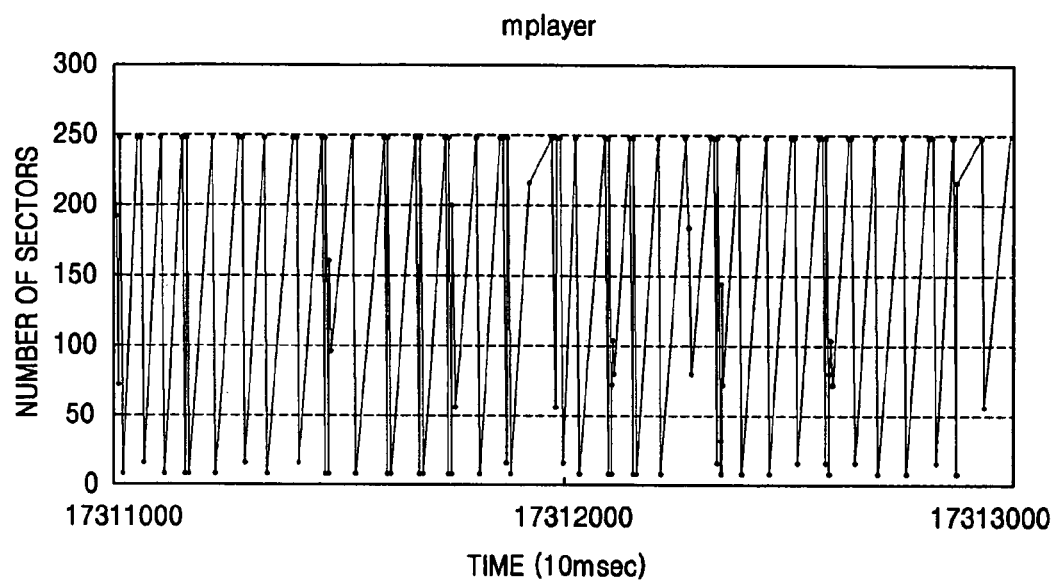
Figure 9I:
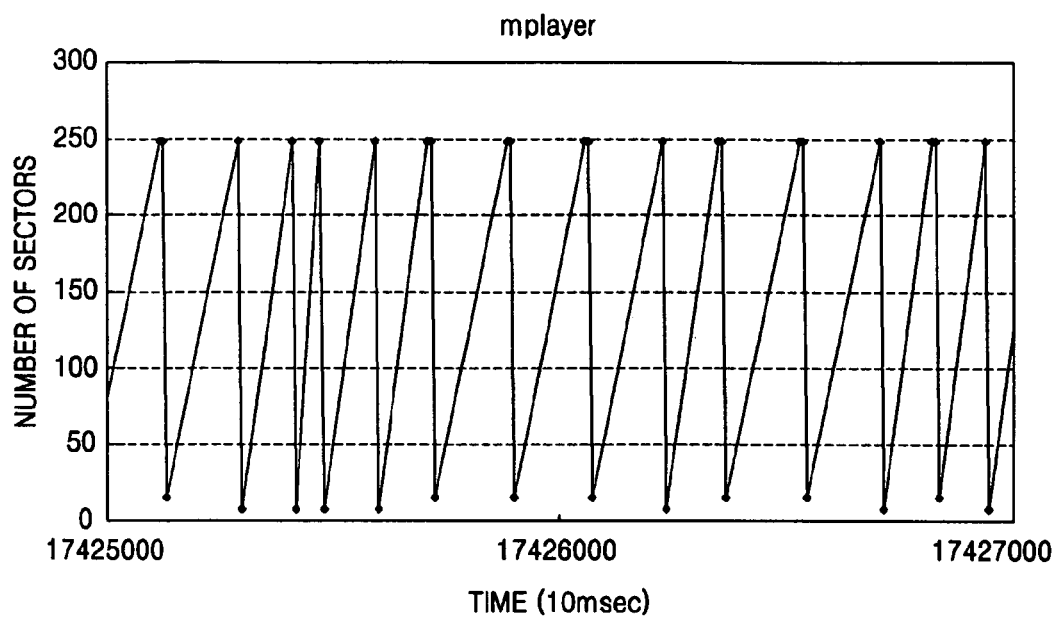
Figure 9J:
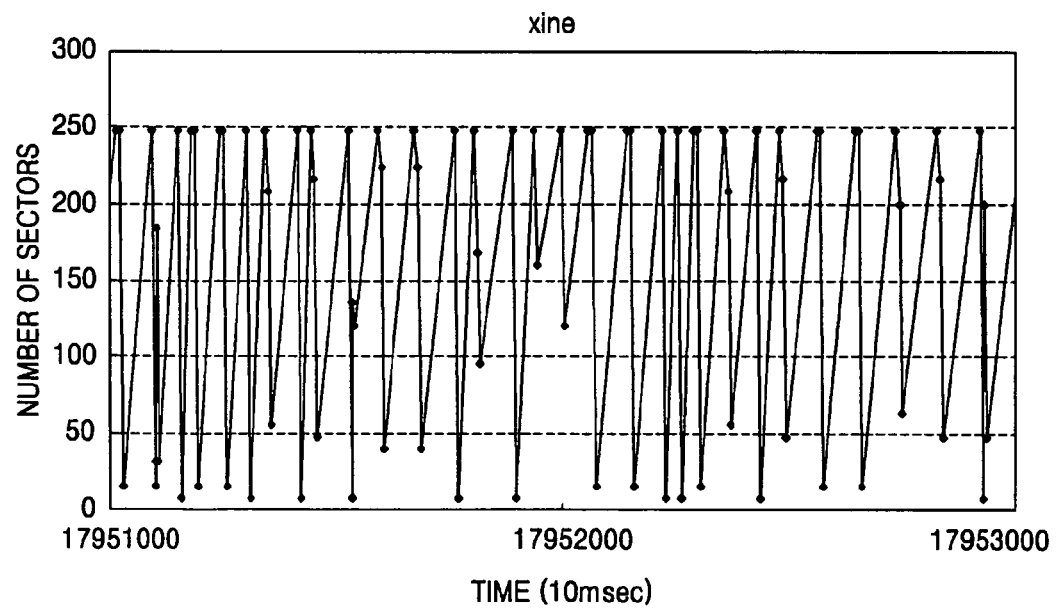
Figure 9K:
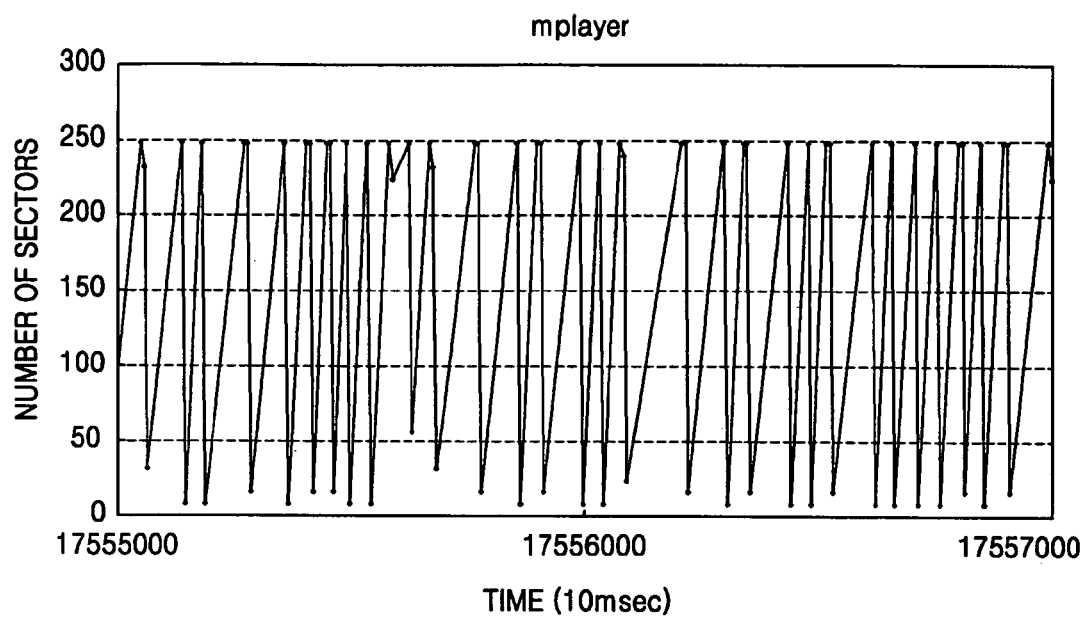
Figure 9L:
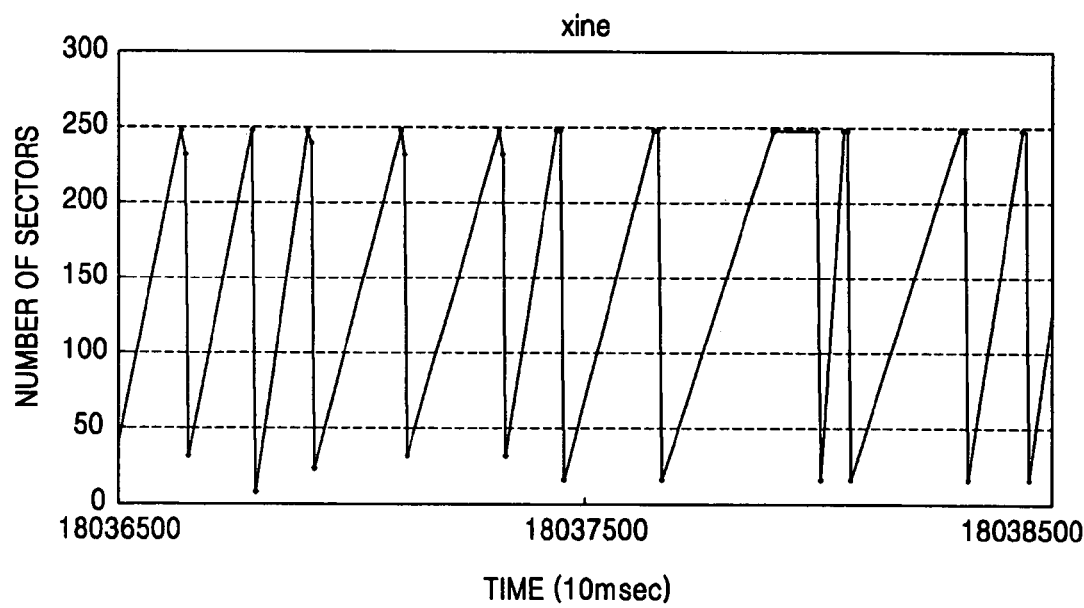
Figures 9M, 10:
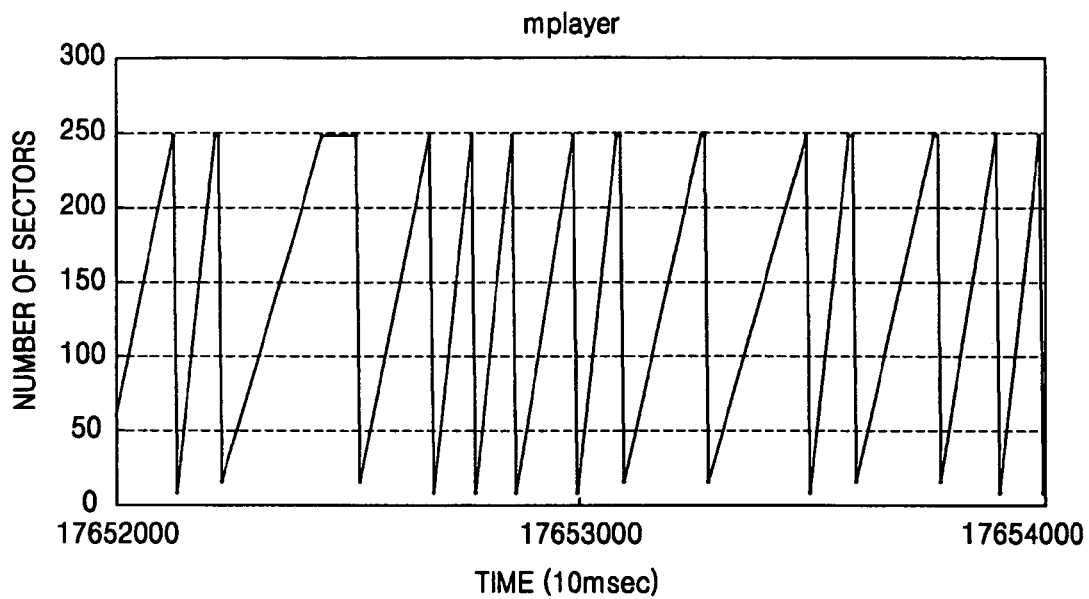
FIG. 10 is a table showing the characteristics of the trace of the input/output commands of the multimedia player shown in FIG. 9.

FIG. 9A shows the trace of the input/output commands of the high quality news which is reproduced at 8.76 Mb/s in xine, FIG. 9B shows the trace of the input/output commands of the high quality news which is reproduced at 8.76 Mb/s in mpeg2dec, FIG. 9C shows the trace of the input/output commands of the high quality news which is reproduced at 8.76 Mb/s in mplayer, FIG. 9D shows the trace of the input/output commands of the low quality news which is reproduced at 0.38 Mb/s in xine, FIG. 9E shows the trace of the input/output commands of the low quality news which is reproduced at 0.38 Mb/s in mplayer, FIG. 9F shows the trace of the input/output commands of the high quality music video which is reproduced at 1.18 Mb/s in xine, FIG. 9G shows the trace of the input/output commands of the high quality music video which is reproduced at 1.18 Mb/s in mplayer, FIG. 9H shows the trace of the input/output commands of the low quality music video which is reproduced at 0.67 Mb/s in xine, FIG. 9I shows the trace of the input/output commands of the low quality music video which is reproduced at 0.67 Mb/s in mplayer, FIG. 9J shows the trace of the input/output commands of the high quality music video which is reproduced at 2.60 Mb/s in xine, FIG. 9K shows the trace of the input/output commands of the high quality music video which is reproduced at 2.60 Mb/s in mplayer, FIG. 9L shows the trace of the input/output commands of the low quality music video which is reproduced at 1.16 Mb/s in xine, and FIG. 9M shows the trace of the input/output commands of the low quality music video which is reproduced at 1.16 Mb/s in mplayer. (The information in this paragraph would be much more accessible in the form of a table.)

FIG. 10 is a table of showing the characteristics of the trace of the input/output commands of the multimedia player shown in FIGS. 9A through 9M. Here, 1 through 6 respectively indicate 8.76 Mb/s high quality news, 0.38 Mb/s low quality news, 1.18 Mb/s high quality music video, 0.67 Mb/s low quality music video, 2.60 Mb/s high quality music video, and 1.16 Mb/s low quality music video. Also, columns A through H of FIG. 10 indicate the average of the intervals between the timings of the read request accession (ms), the standard deviation of the intervals between the timings of the read request accession (ms), the median of the intervals between the timings of the read request accession (ms), the range of the intervals between the timings of the read request accession (ms), the average of the read request sizes (number of sectors), the average of the write request sizes (number of sectors), the read request ratio (%) and the write request ratio (%).

Referring to FIGS. 9A through 9M and 10, the input/output commands of the multimedia players such as xine, mplayer and mpeg2dec have different features according to the kind of multimedia player and the quality of the moving image, but also have the following common features.

First, a certain amount of the data is periodically requested to the disk. Second, all the multimedia players have the trace of the input/output commands which repeatedly generate the input/output request having continuous 248 or 8 sectors. This is generated because the multimedia files are continuously stored in the disk. Third, the multimedia player reads a multimedia file, but the write operation for periodically updating the inode of the file is also generated.

As shown in FIGS. 9A through 9M and 10, the input/output commands of the multimedia applications have common features. Since the classifying unit can check these common features, it can determine whether the load of the input/output command corresponds to the multimedia application.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data input or output control method in a system for inputting data to or outputting data from a disk sector according to an input or output command from a disk driver, the method comprising:

extracting, from the disk driver, the input or output command for inputting the data to or outputting the data from the disk sector;

generating a set of input or output commands based on the extracted input or output command;

analyzing a load feature of the extracted input or output command based on the generated set of input or output commands;

determining whether a load of the generated set of input or output commands corresponds to a multimedia application based on the analyzed load feature of the extracted input or output command; and controlling the data which is input to or output from the disk to correspond to the multimedia application according to the determination result.

2. The method according to claim 1, wherein the extracting the input or output command comprises:

extracting, from the disk driver, input or output commands for inputting the data to or outputting the data from the disk sector and storing the extracted input or output commands during a first time period, and the generating the set of input or output commands comprises:

generating the set of input or output commands based on recent input or output commands during a second period from among the input or output commands stored during the first time period.

3. The method according to claim 2, wherein the extracting the input or output commands comprises:

if a new input or output command is requested from the disk driver, removing an oldest input or output command from the input or output commands stored during the first time period and extracting the new input or output command and storing the newly extracted input or output command with the remaining stored input or output commands during the first time period.

4. The method according to claim 3, wherein the first time period and the second time period are equal to each other.

5. The method according to claim 2, wherein the analyzing the load feature of the extracted input or output command comprises:

extracting load features of the input or output commands from the generated set of input or output commands; and analyzing the extracted load features of the input or output commands by calculating a statistic of the load features of the input or output commands from the load features of the input or output commands.

6. The method according to claim 5, wherein the load features of the input or output command comprises at least one of an input or output request time, a number of input or output sectors and a location of the input or output sectors.

7. The method according to claim 5, wherein the statistic of the load features of the input or output commands comprises at least one of an average of an input or output request time interval, a standard deviation, a median, a range of the input or output request time intervals, a number of sectors read during a unit of time, and a number of input or output commands during a unit of time.

8. The method according to claim 5, wherein the determining whether the load of the input or output command corresponds to the multimedia application comprises:

classifying, by a classifying unit, the load features of the input or output command based on the statistic of the load features of the input or output commands and a learning result generated by learning a load feature of the input or output command of the multimedia application; and determining whether the load of the input or output command corresponds to the multimedia application, based on the classification by the classifying unit.

9. The method according to claim 8, wherein the load feature of the input or output command of the multimedia application is learned by Bayesian learning, a neutral network, boosting, or a support vector machine method.

10. The method according to claim 8, wherein the controlling the data comprises:

setting a field value for representing whether the load of the input or output command corresponds to the multimedia application, according to the determination result; and controlling the data which is input to or output from the disk based on the set field value.

11. The method according to claim 10, wherein the controlling the data which is input to or output from the disk based on the set field value comprises if the set field value is set to a first value which represents the load of the input or output command corresponding to the multimedia application, controlling the data such that a maximum size of the disk sector requested by the input or output command is increased.

12. The method according to claim 10, wherein the controlling the data which is input to or output from the disk based on the set field value comprises if the set field value is set to a first value which represents the load of the input or output command corresponding to the multimedia application, controlling the data such that errors in the data read from the disk are not corrected.

13. The method according to claim 10, wherein the controlling the data which is input to or output from the disk based on the set field value comprises if the set field value is set to a first value which represents the load of the input or output command corresponding to the multimedia application, controlling the data such that the type of input or output command is filtered and input or output commands which are not necessary for the multimedia application are not performed.

14. The method according to claim 13, wherein the input or output commands which are not necessary for the multimedia application are write commands for updating the access time of an inode for storing information related to a file.

15. The method according to claim 10, wherein, in the controlling the data which is input to or output from the disk based on the set field value, the data is controlled such that the sectors located in the path on which a disk arm moves to read a predetermined sector are read, if the set field value is set to a first value which represents the load of the input or output command corresponding to the multimedia application.

16. A computer-readable medium having embodied thereon a computer program for executing a data input or output control method in a system for inputting data to or outputting data from a disk sector according to an input or output command from a disk driver, the method comprising:

extracting, from the disk driver, the input or output command for inputting the data to or outputting the data from the disk sector;

generating a set of input or output commands based on the extracted input or output command;

analyzing a load feature of the extracted input or output command based on the generated set of input or output commands;

determining whether a load of the generated set of input or output commands corresponds to a multimedia application based on the analyzed load feature of the extracted input or output command; and controlling the data which is input to or output from the disk to correspond to the multimedia application according to the determination result.

17. A data input or output control apparatus in a system for inputting/outputting data to/from a disk sector according to an input or output command provided from a disk driver, the apparatus comprising:

an extracting unit which extracts, from the disk driver, the input or output command for inputting the data to or outputting the data from the disk sector and generates a set of input or output commands from the extracted input or output command;

an analyzing unit which analyzes a load feature of the extracted input or output command based on the generated set of input or output commands;

a determining unit which determines whether a load of the generated set of input or output commands corresponds to a multimedia application based on the analyzed load feature of the extracted input or output command; and a controlling unit which controls the data which is input to or output from the disk to correspond to the multimedia application according to a determination result of the determining unit.

18. The apparatus according to claim 17, wherein the extracting unit comprises:

a storing unit which stores the extracted input or output commands for inputting the data to or outputting the data from the disk sector during a first time period; and a generating unit which generates the set of input or output commands based on recent input or output commands during a second time period from among the input or output commands stored during the first time period.

19. The apparatus according to claim 18, wherein the generating unit comprises:

a first extracting unit which extracts the input or output commands and stores the input or output commands in the storing unit;

an updating unit which, if a new input or output command is requested from the disk driver, removes an oldest input or output command from the input or output commands stored during the first time period;

wherein the extracting unit extracts the new input or output command from the disk Driver, and the storing unit stores the newly extracted input or output command with the remaining stored input or output commands during the first time period, and an input or output command set generating unit which generates the set of input or output commands based on recent input or output commands during the second time period from among the updated input or output commands.

20. The apparatus according to claim 19, wherein the first time period and the second time period are equal to each other.

21. The apparatus according to claim 18, wherein the analyzing unit comprises:

a second extracting unit which extracts load features of the input or output commands from the generated set of input or output commands; and a calculating unit which calculates a statistic of the load features of the input or output commands from the load features of the input or output commands.

22. The apparatus according to claim 21, wherein the load features of the input or output command comprise at least one of an input or output request time, a number of input or output sectors, and a location of the input or output sectors.

23. The apparatus according to claim 21, wherein the statistic of the load features of the input or output commands comprises at least one of an average of an input or output request time interval, a standard deviation, a median, a range of the input or output request time interval, a number of sectors read during a unit of time, and a number of input or output commands during a unit of time.

24. The apparatus according to claim 21, wherein the determining unit comprises:

a classifying unit which classifies the load features of the input or output command based on a learning result generated by learning a load feature of the input or output command of the multimedia application and the statistic of the load features of the input or output commands; and a load determining unit which determines whether the load of the input or output command corresponds to the multimedia application based on the classification of the classifying unit.

25. The apparatus according to claim 24, wherein the load feature of the input or output command of the multimedia application is learned by Bayesian learning, neutral network, boosting, or support vector machine method.

26. The apparatus according to claim 24, wherein the controlling unit comprises:

a setting unit which sets a field value for representing whether the load of the input or output command corresponds to the multimedia application, according to the determination result of the determining unit; and an input or output controlling unit which controls the data which is input to or output from the disk based on the set field value.

27. The apparatus according to claim 26, wherein the input or output controlling unit controls the data such that a maximum size of the disk sector requested by the input or output command is increased, if the field value is set to a first value which represents the load of the input or output command corresponding to the multimedia application.

28. The apparatus according to claim 26, wherein the input or output controlling unit controls the data such that errors in the data read from the disk are not corrected, if the field value is set to a first value which represents the load of the input or output command corresponding to the multimedia application.

29. The apparatus according to claim 26, wherein the input or output controlling unit controls the data such that the type of input or output command is filtered and input or output commands which are not necessary for the multimedia application are not performed, if a field value is set to the first value which represents the load of the input or output command corresponding to the multimedia application.

30. The apparatus according to claim 29, wherein the input or output commands which are not necessary for the multimedia application are write commands for updating the access time of an inode which stores information related to a file.

31. The apparatus according to claim 26, wherein, the input or output controlling unit controls the data such that sectors located in the path on which a disk arm moves to read a predetermined sector are read, if the set field value is set to a first value which represents the load of the input or output command corresponding to the multimedia application.

32. The data input or output control method of claim 1, wherein in the determining whether the load of the generated set of input or output commands corresponds to the multimedia application, if it is determined that the load of the generated set of input or output commands corresponds to the multimedia application, the controlling the data comprises changing a size of a disk sector requested by the generated set of input or output commands.

33. the computer-readable medium of claim 16, wherein in the determining whether the load of the generated set of input or output commands corresponds to the multimedia application, if it is determined that the load of the generated set of input or output commands corresponds to the multimedia application, the controlling the data comprises changing a size of a disk sector requested by the generated set of input or output commands.

34. The data input or output control apparatus of claim 17, wherein if the determining unit determines that the load of the generated set of input or output commands corresponds to the multimedia application, the controlling unit changes a size of a disk sector requested by the generated set of input or output commands.

* * * * *